(12) United States Patent
Thigpen

(10) Patent No.: US 8,805,150 B2
(45) Date of Patent: Aug. 12, 2014

(54) BEND RADIUS MANAGER/SUPPORT MECHANISM

(75) Inventor: Thomas A. Thigpen, Highland Village, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 12/628,793

(22) Filed: Dec. 1, 2009

(65) Prior Publication Data

US 2011/0129193 A1 Jun. 2, 2011

(51) Int. Cl.
*G02B 6/00* (2006.01)

(52) U.S. Cl.
USPC .................. 385/135; 385/134; 385/147

(58) Field of Classification Search
USPC .......................................... 385/134–137, 147
See application file for complete search history.

(56) References Cited

U.S. PATENT DOCUMENTS

2009/0290842 A1* 11/2009 Bran de Leon et al. ...... 385/135

* cited by examiner

*Primary Examiner* — Rhonda Peace

(57) ABSTRACT

A bend radius manager includes a base having a surface, and a plurality of discrete lobes with at least one arcuate section extending away from the base surface and terminating at a top surface, an outer surface defined between the base and the top surface, the plurality of lobes configured to receive at least one media having a minimum bend radius.

12 Claims, 4 Drawing Sheets

BEND RADIUS MANAGER/SUPPORT MECHANISM

BACKGROUND

Bend radius management has become a common requirement when dealing with communication-based media including cables, wires, and strands. If media is bent such that the minimum bend radius of the media is exceeded, performance may be at least partially compromised. For example, exceeding the minimum bend radius of a fiber optic cable can create attenuations in the cable, where light may escape from the glass core of the cable, resulting in a signal loss. If the fiber optic cable is bent far enough, the transmission of light through the fiber optic cable may stop completely. Under some bending scenarios the glass core itself could break.

DETAILED DESCRIPTION

Figure 1:
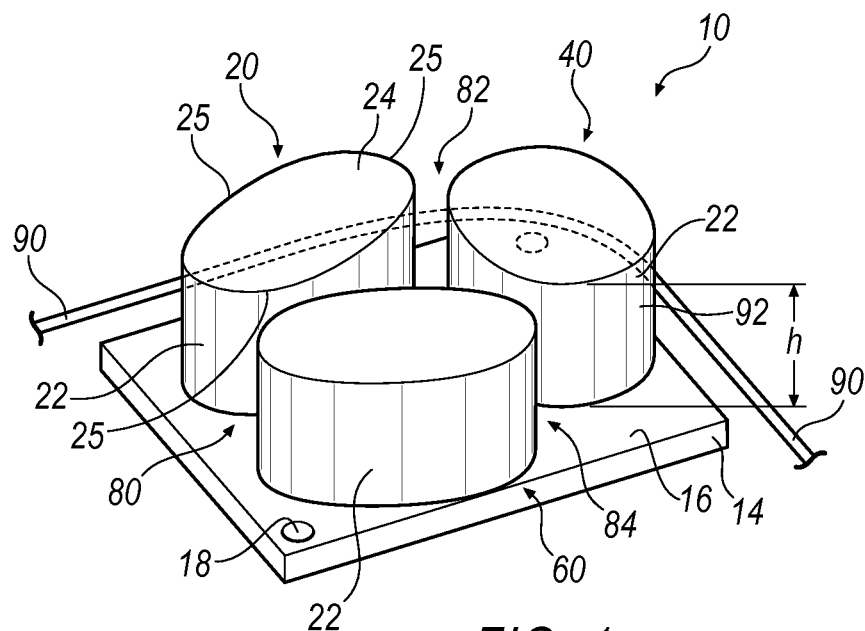
FIG. 1 is a perspective view of a bend radius manager.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

Figure 2:
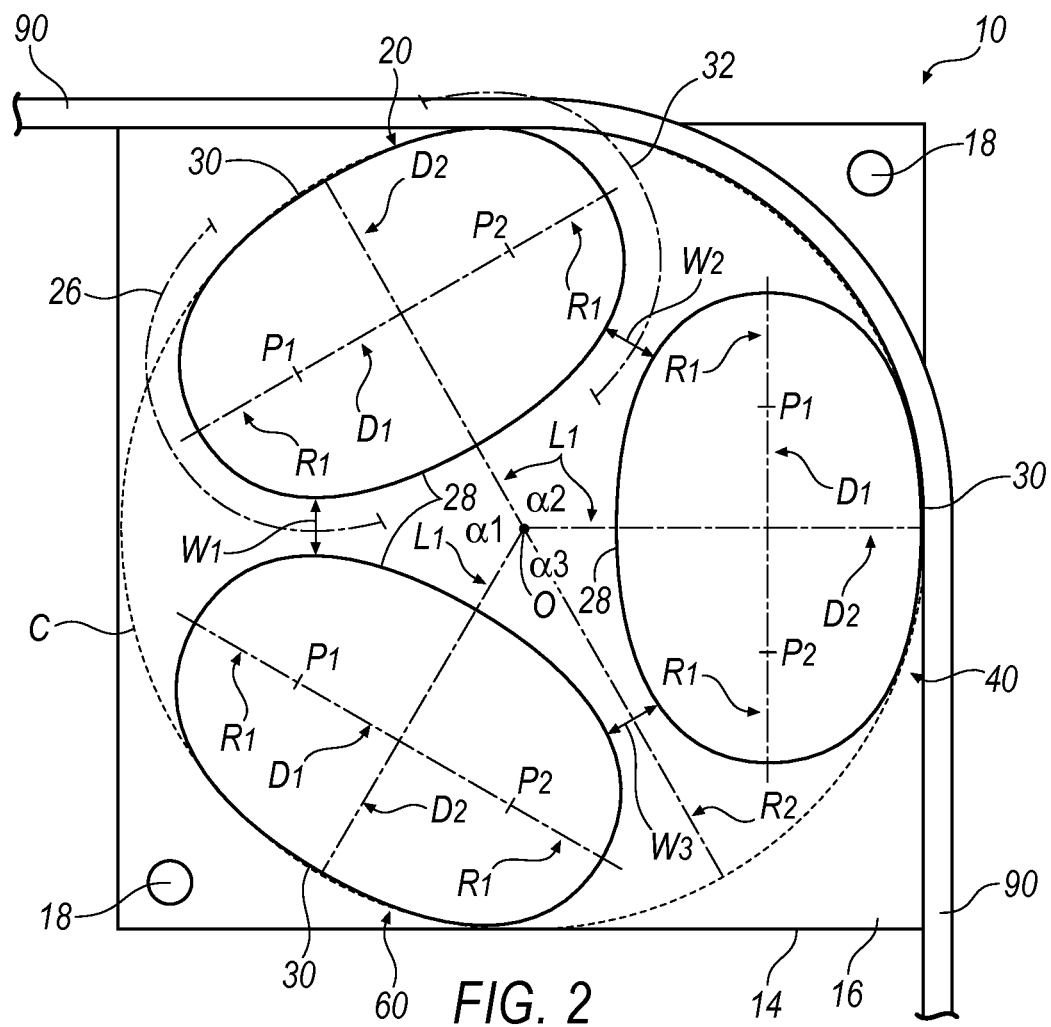
FIG. 2 is a top view of the bend radius manager of FIG. 1.

As seen in FIGS. 1-2, a bend radius manager 10 is configured to receive a plurality of communication-based media 90 having differing minimum bend radii, such as fiber optic cables, coaxial cables, wires or strands, and includes a base 14 having an upper surface 16 and a plurality of discrete lobes 20, 40, 60 extending from the upper surface 16 of the base 14 and terminating at a top surface 24. Bend radius manager 10 receives media 90 such that media 90 may be directed to a desired location, while preserving the minimum bend radius of the media 90. Bend radius manager 10 may also receive the weight of media 90, thus relieving strain on media 90. Media 90 may be disposed about the outer periphery of two or more of lobes 20, 40, 60, may be disposed through bend radius manager 10 via media channels 80, 82, 84 defined between adjacent lobes 20, 40, 60, or may be disposed through bend radius manager 10 via media channels 80, 82, 84 and about the outer periphery of one or more lobes 20, 40, 60. The path of media 90 through or about bend radius manager 10 is dependent upon the minimum bend radius of media 90 and the configuration of bend radius manager 10. Media 90 are disposed about lobes 20, 40, 60 of bend radius manager 10 such that the minimum bend radius of each media 90 is not exceeded.

Base 14 is shown in FIGS. 1-2 as having a generally square shape for exemplary purposes. However, base 14 may be provided in a variety of configurations, including, but not limited to, rectangular, circular, or triangular. Base 14 may include mounting holes 18 to enable mounting of bend radius manager 10 to a support structure. Moreover, while upper surface 16 is shown as generally planar, under some circumstances a non-planar surface may be applicable.

Lobes 20, 40, 60 are generally perpendicular to base 14, and are generally parallel to each other. Lobes 20, 40, 60 may be disposed on, or formed integrally with, base 14. Although bend radius manager 10 is shown as having three lobes 20, 40, 60, alternate configurations of bend radius manager 10 may include more or less than three lobes.

Lobes 20, 40, 60 may be substantially similar to each other in that lobes 20, 40, 60 may have substantially similar dimensions and cross-sectional shape. Accordingly, the following description of lobe 20 equally applies to lobes 40 and 60. Lobe 20 includes an outer surface 22 defined between the base 14 and the top surface 24. Lobe 20 has a height h from the upper surface 16 of the base 14 to the top surface 24 of the lobe 20. The larger the height h of lobe 20, the greater the surface area of outer surface 22 of lobe 20, which allows for a greater number of media 90 that can be disposed about the outer surface 22 of lobe 20. In alternate configurations, the lobes may not be substantially similar to each other. In such a configuration, the lobes may include varying heights. Additionally, the radial dimensions of the lobes of such an alternate configuration may vary from lobe to lobe, thereby permitting the insertion of media of a wider range of minimum bend radii.

As shown in FIGS. 1-2, lobe 20 has a generally oval cross-section. However, in alternate configurations, some or all of the lobes 20, 40, 60 may have a generally circular cross-section, rather than an oval cross-section. In the illustrated example, the generally oval cross-section of lobe 20 provides lobe 20 with a plurality of arcuate sections 25, which permits bend radius manager 10 to receive media 90 of differing dimensions and minimum bend radii. The arcuate sections 25 of lobe 20 include generally rounded opposing end portions 26, 32, inner side portion 28 and outer side portion 30. Inner side portion 28 and outer side portion 30 are positioned between opposing end portions 26, 32. Lobe 20 has a main diameter D1 and a lesser diameter D2. End portions 26, 32 of lobe 20 have radii R1 from center points P1 and P2 respectively, which lie along main diameter D1.

In the illustrated example lobes 20, 40, 60 are arranged on base 14 such that the axes of lesser diameters D2 of each lobe 20, 40, 60 intersect to define a common origin point O. In this manner, lobes 20, 40, 60 are disposed on base 14 in a generally circular configuration defined in part by the outer side portions 30 of the lobes 20, 40, 60. The outer circumference of the generally circular configuration of the lobes 20, 40, 60 is indicated by the dotted line C shown in FIG. 2, which includes the outer side portions 30 of the lobes 20, 40, 60. Inner side portions 28 of lobes 20, 40, 60 are spaced from the common origin point O at the lesser diameter D2 of lobe 20 by a distance L1, such that the generally circular configuration of lobes 20, 40, 60 defined by circumference C about common origin point O has a radius R2, where R2=L1+D2. The radius R2 of the generally circular configuration of lobes 20, 40, 60 is larger than the radius R1 of end portions 26, 32.

Figure 3A:
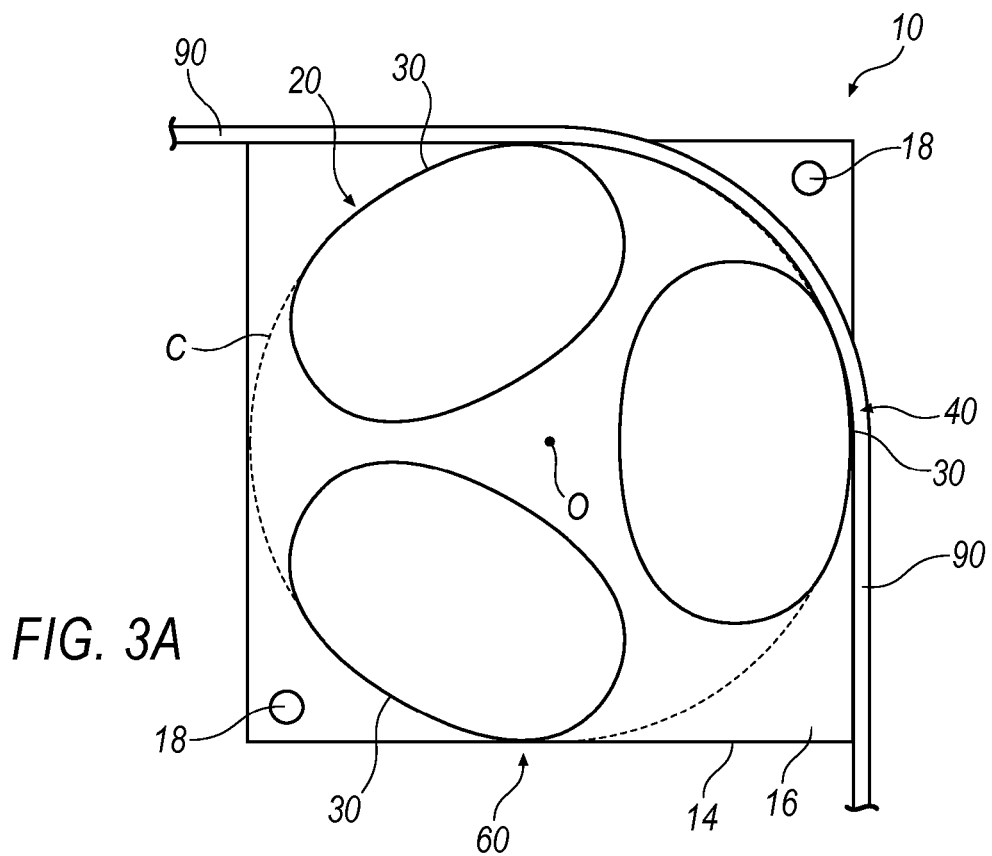
FIGS. 3a and b are illustrations of the bend radius manager of FIG. 1 with media disposed about the bend radius manager.
Figure 3B:
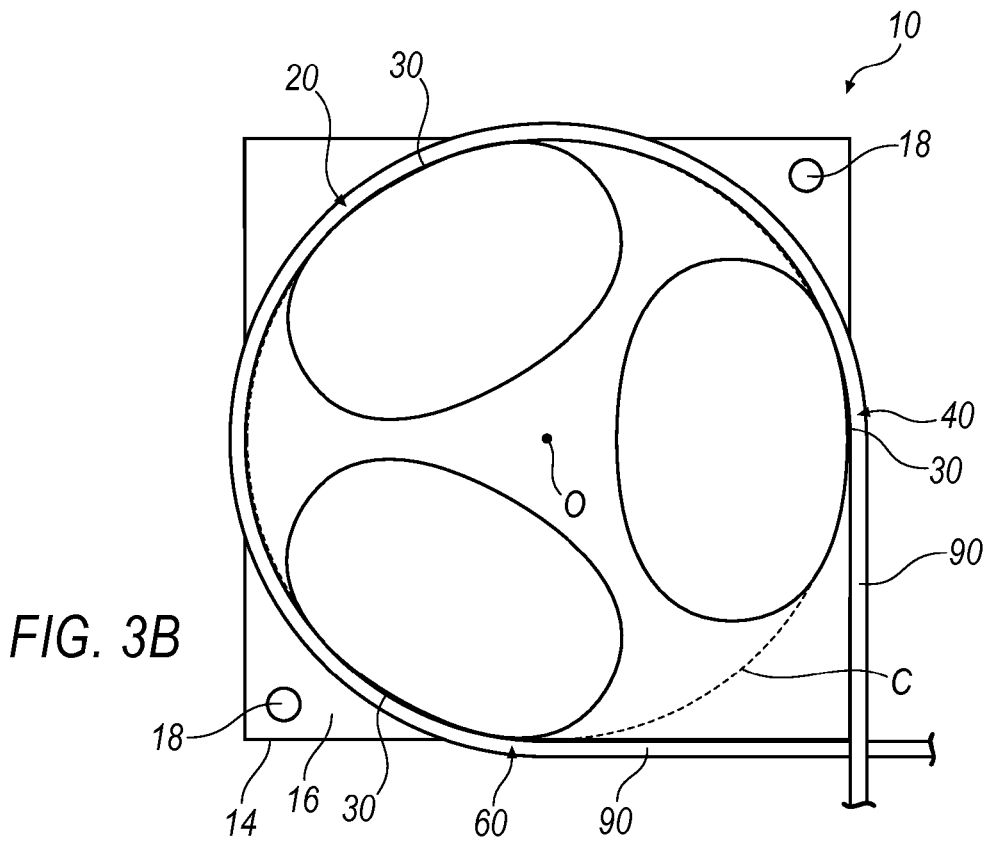

Although base 14 is shown in FIG. 2 as having a side radial extent corresponding to the radius R2 of circumference C, this is just for illustrative purposes. Base 14 may have dimensions larger than that of radius R2 of circumference C, particularly if a different shape is utilized and there is still a need to have enough space within base 14 to permit the use of mounting holes 18. Moreover, a greater extent may be desired to help hold media 90 if the media is arranged in a manner as shown in FIGS. 3a and 3b, as discussed in more detail below.

Lobes 20, 40, 60 are spaced apart from each other about the circumference C of the generally circular configuration of the lobes 20, 40, 60. Accordingly, the axes of the lesser diameters D2, which intersect point of origin O of any two adjacent lobes 20, 40, 60 are separated by angles $\alpha_1, \alpha_2, \alpha_3$, as shown in FIG. 2. The spacing between adjacent lobes 20, 40, 60 along the circumference C may be varied. In one configuration, each lobe 20, 40, 60 may be equally spaced from its adjacent lobe 20, 40, 60 along the circumference C. In this configuration, $\alpha_1 = \alpha_2 = \alpha_3$ such that $\alpha_1, \alpha_2$ and $\alpha_3$ all equal approximately 120°.

Figure 4A:
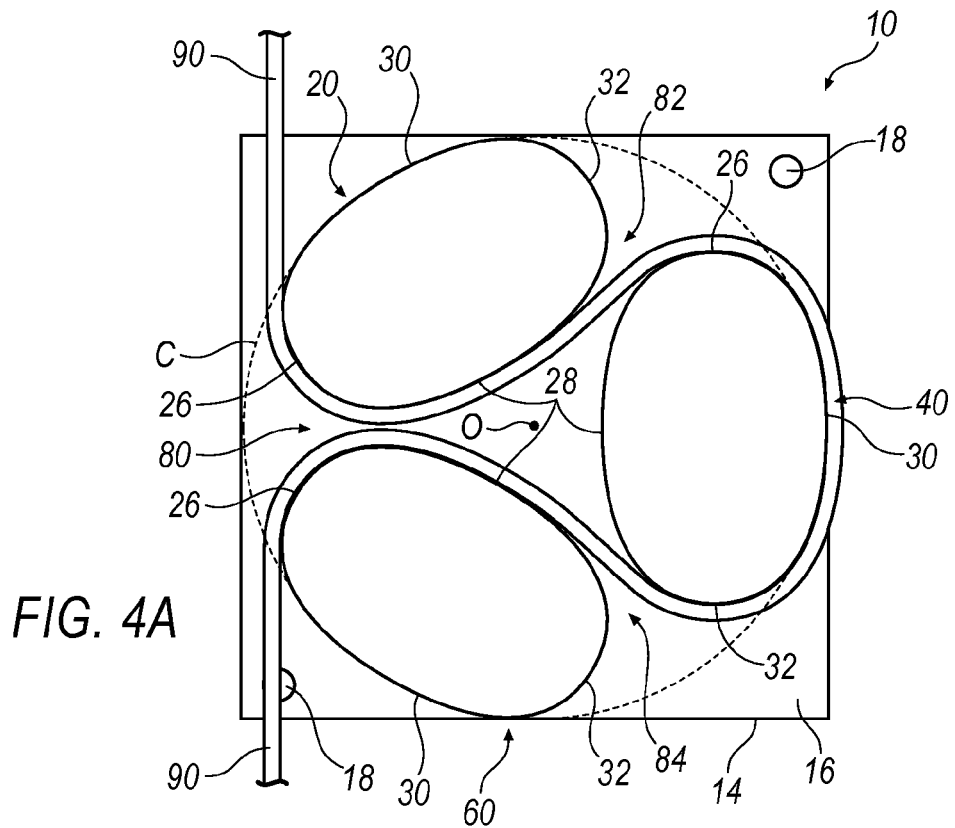
FIGS. 4a and b are alternate illustrations of the bend radius manager of FIG. 1 with media disposed about the bend radius manager.

As shown in FIGS. 1 and 2, media channels 80, 82, 84 defined by the outer surfaces 22 of two adjacent lobes 20, 40, 60 are formed between such adjacent lobes 20, 40, 60. The media channels 80, 82, 84 have widths $w_1, w_2, w_3$ at the points where the adjacent lobes 20, 40, 60 are closest to each other. The widths $w_1, w_2, w_3$ of media channels 80, 82, 84 are large enough such that media 90 can pass between adjacent lobes 20, 40, 60 while contacting portions of the outer surfaces 22 of lobes 20, 40, 60 as shown in FIGS. 4a and b. If widths $w_1, w_2, w_3$ are too large, media 90 may be able to pass through media channels 80, 82, 84 without contacting any portions of the outer surfaces 22 of lobes 20, 40, 60. In the configuration where each lobe 20, 40, 60 is substantially similar to each other and equally spaced from its adjacent lobe 20, 40, 60 along the circumference C, widths $w_1, w_2, w_3$ of media channels 80, 82, 84 are generally equal to each other. Having generally equal widths $w_1, w_2, w_3$ of media channels 80, 82, 84 will allow any media 90 disposed in one of media channels 80, 82, 84 to exit bend radius manager 10 through any of media channels 80, 82, 84.

The outer surfaces 22 of lobes 20, 40, 60 may be roughened to increase friction, and thus adherence, between the outer surfaces 22 and media 90 disposed on the outer surfaces 22. Alternatively, a coating 92 may be applied to the outer surfaces 22 of the lobes 20, 40, 60 to increase the frictional qualities of the outer surfaces 22. Such coatings 92 may include, but not be limited to, contact gels, grits and silicon type coatings. The increased friction between media 90 and lobes 20, 40, 60 provided by the roughened outer surface 22 or coating 92 may prevent media 90 from being dislodged from the lobes 20, 40, 60 upon experiencing vibration or the like.

Radius R2 of the generally circular configuration of lobes 20, 40, 60 defines the minimum bend radius of media 90 that may be disposed along the outer side surfaces 30 of lobes 20, 40, 60 as shown in FIGS. 3a-b. Media 90 disposed along the outer side surfaces 30 will bend in accordance with the radius defined by the curve of the outer side surfaces 30, which is R2. Thus, media 90 disposed on outer side surfaces 30 with a radius R2 of the generally circular configuration of lobes 20, 40, 60 generally equal to or greater than the minimum bend radius of media 90 will not exceed the minimum bend radius of the media 90. Slightly exceeding the minimum bend radius of media 90 may not have an impact on the performance of media 90, depending on the tolerances of the specific media 90.

As an example, one common communications-based media 90 is the G.652 SM fiber optic cable, which has a minimum bend radius of 1.5 inches (3.81 cm). Such media 90 may be disposed upon the outer side portions 30 of lobes 20, 40, 60 of bend radius manager 10, provided that the radius R2 of the generally circular configuration of lobes 20, 40, 60 is at least generally equal to or greater than the minimum bend radius of the G.652 SM fiber.

As shown in FIG. 3a, media 90 may approach an outer side portion 30 of bend radius manager 10, be disposed on the outer side portions 30 of two lobes 20, 40, and then extend away from bend radius manager 10. As media 90 in FIG. 3a is only disposed on the outer side portions 30 of lobes 20, 40, which define the generally circular configuration of lobes 20, 40, 60, the bend radius experienced by media 90 is equal to the radius R2 of the circular configuration defined by circumference C. In this manner, the bends experienced by media 90 do not exceed the minimum bend radius of the media 90. Additionally, bend radius manager 10 also serves to allow for changes in the direction of media 10 which are disposed about bend radius manager 10. As shown in FIG. 3a, media 90 may approach bend radius manager 10 from one direction, and depart from bend radius manager 10 in another direction. Thus, the direction of media 10 may be altered, while maintaining the minimum bend radius of media 90.

Such media 90 may be disposed about the outer side portions 30 of lobes 20, 40, 60 in a variety of ways. One such example is shown in FIG. 3b, where media 90 is disposed about the outer surfaces 30 of all three lobes 20, 40, 60, while still maintaining the minimum bend radius of the media 90.

As with radius R2 of the generally circular configuration of lobes 20, 40, 60, radius R1 of the end portions 26, 32 of lobes 20, 40, 60 defines the minimum bend radius of media 90 that may be disposed between the lobes 20, 40, 60 of bend radius manager 10. Media 90 disposed along an end portion 26, 32 will bend in accordance with the radius defined by the curve of the end portion 26, 32, which is R1. Thus, media 90 disposed on an end portion 26, 32 with a radius R1 generally equal to or greater than the minimum bend radius of media 90 will not exceed the minimum bend radius of the media 90.

As an example, other common communications-based media 90 includes the G.657 A SM fiber, which has a minimum bend radius of 10 mm (0.393 inches), and the G.657 B SM fiber, which has a 7 mm (0.275 inch) minimum bend radius. Such media 90 may be disposed upon the end portions 26, 32 of lobes 20, 40, 60 of bend radius manager 10, provided that the radius R1 of end portions 26, 32 is equal to or greater than the minimum bend radius of the G.657 A or B SM fiber. Thus, by providing a radius R1 of 10 mm (0.393 inches) or greater, both the G.657 A SM fiber and the G.657 B SM would be able to be disposed through bend radius manager 10 and about end portions 26, 32 of lobes 20, 40, 60 without exceeding the minimum bend radius of either fiber.

One example of media 90 disposed through bend manager 10 is shown in FIG. 4a. Media 90 may pass through media channel 80 and be disposed upon the end portion 26 and inner side portion 28 of lobe 20, pass through media channel 82 and be disposed upon both end portions 26, 32 and the outer side portion 30 of lobe 40, pass through media channel 84 and be disposed on the inner side portion 28 of lobe 60, and finally again pass through media channel 80 and be disposed on end portion 26 of lobe 60. Media 90 experiences several bends through this path, and the greatest bend radius experienced by media 90 corresponds to the radius R1 of end portions 26, 32 of the lobes 20, 40, 60 that media 90 is disposed upon. Thus, the minimum bend radius of the media 90 is not exceeded. The configuration of lobes 20, 40, 60 also ensures that any media 90 passing through any of media channels 80, 82, 84 will contact a surface portion of at least one lobe 20, 40, 60.

Figure 4B:
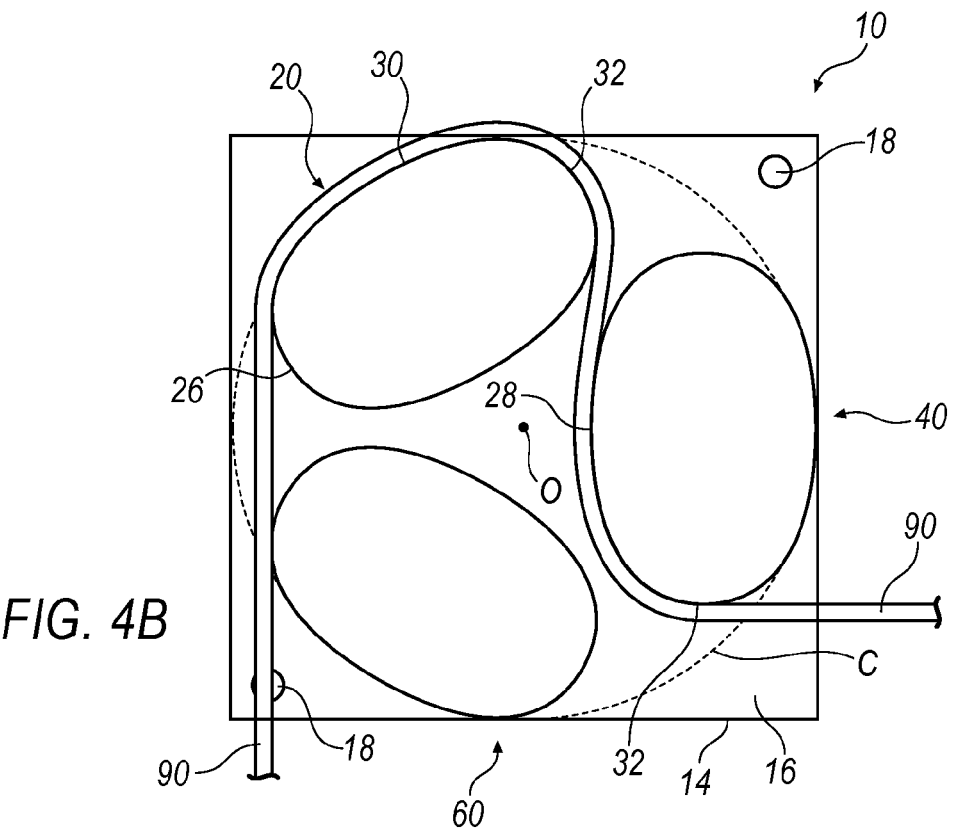

Such media 90 may be disposed about the lobes 20, 40, 60 in a variety of ways. One such example is shown in FIG. 4b, where media 90 is disposed about portions of two of the lobes 20, 40 while still maintaining the minimum bend radius of the media 90. Additionally, bend radius manager 10 also serves to allow for changes in the direction of media 10 which are disposed through bend radius manager 10. As shown in FIG. 4b, media 90 may approach bend radius manager 10 from one direction, be disposed through bend radius manager 10 and about portions of lobes 20, 40, 60, and exit from bend radius manager 10 in another direction.

Figure 5:
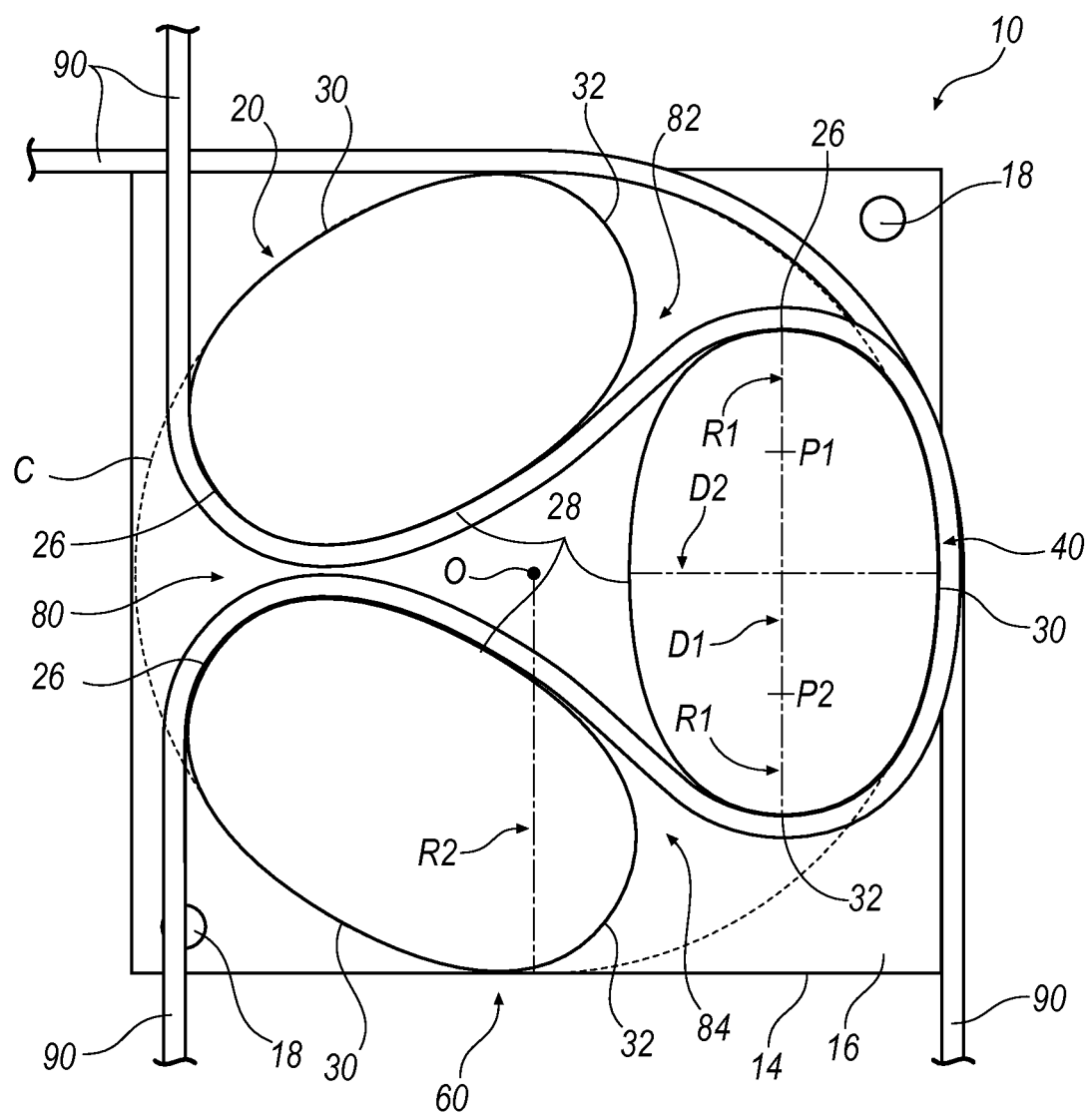
FIG. 5 is an alternate illustration of the bend radius manager of FIG. 1 with a plurality of media of differing minimum bend radii disposed about the bend radius manager.

Additionally, a plurality of media 90 having differing minimum bend radii may be disposed about the same bend radius manager 10, as shown in FIG. 5. A media 90 having a larger minimum bend radius may be disposed about the outer side portions of lobes 20, 40, 60 provided that the minimum bend radius of the media 90 is less than or equal to the radius R2 of the circumference C of the circular configuration of lobes 20, 40, 60. A media 90 having a smaller minimum bend radius may also be disposed about the outer side portions of lobes 20, 40, 60, or may be disposed through bend radius manager 10 and about various end portions 26, 32, inner side portions 28, and outer side portions 30 of lobes 20, 40, 60, provided that the minimum bend radius of the media 90 is at least generally less than or equal to the radius R1 of end portions 26, 32.

In operation, base 14 may be mounted to a support structure such as by way of mounting holes 18. One or more media 90 may then be navigated about and disposed upon any or all of lobes 20, 40, 60. Depending on the minimum bend radius of the media 90, media 90 may be navigated about lobes 20, 40, 60 in a variety of ways. If the circumference C of the generally circular configuration of lobes 20, 40, 60 has a radius R2 at least generally equal to or greater than the minimum bend radius of the media 90, the media 90 may be navigated about and disposed upon the outer side portions 30 of two or more of lobes 20, 40, 60, as shown in FIGS. 3a-b. As radius R1 is less then radius R2, any media 90 which may be navigated about the outer side portion of lobes 20, 40, 60 without exceeding the minimum bend radius of media 90 may also be navigated to enter bend radius manager 10 through any of media channels 80, 82, 84, navigated about and disposed upon an end portion 26, 30 and an inner side portion 28 of one of lobes 20, 40, 60 and about and end portion of another of lobes 20, 40, 60, and navigated to exit bend radius manager 10 through the media channel 80, 82, 84 defined between the two adjacent lobes 20, 40, 60 the media 90 was navigated about as shown in FIG. 4b. Media 90 may then be navigated to re-enter bend radius manager 10 as shown in FIG. 4a.

All of the media 90 disposed about bend radius manager 10 do not have to be disposed about bend radius manager 10 in the same way. Media 90 having similar minimum bend radii may be disposed about or through bend radius manager 10 in different ways, as shown in FIGS. 3a-b and 4a-b. Additionally, a plurality of media 90 having differing minimum bend radii may be disposed about the same bend radius manager 10, as shown in FIG. 5.

Media 90 are prevented from accidentally being removed from contact with the outer surfaces 22 of lobes 20, 40, 60 by the roughness of outer surface 22, which increases the frictional contact between media 90 and outer surface 22.

Media 90 can extend unsupported over large distances, and the media 90 carries its own weight over such distances. Such weight carried by media 90 can cause strain on the media 90, which may result in damage to media 90. In addition to maintaining the minimum bend radius of the media 90, lobes 20, 40, 60 also serve to relieve strain on the media 90 by receiving the weight of the media 90 disposed on the various surfaces of the lobes 20, 40, 60. When media 90 is disposed on portions of the outer surfaces 22 of lobes 20, 40, 60, such portions of the outer surfaces 22 support the media 90, and in supporting the media, receive some of the weight of the media 90. Reducing the weight carried by media 90 reduces the strain on the media 90. The greater the length of media 90 disposed on outer surfaces 22 of lobes 20, 40, 60, the greater the amount of weight of media received by lobes 20, 40, 60, and the greater the reduction in strain experienced by media 90.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A bend radius manager comprising:
a base having a surface; and
a plurality of discrete lobes extending away from the base surface and terminating at a top surface, an outer surface including at least one arcuate section defined between the base and the top surface, the plurality of lobes configured to receive and maintain a minimum bend radius of at least one media having the minimum bend radius, and
wherein at least one portion of the outer surface of at least one of the plurality of lobes is roughened to increase the frictional qualities of the outer surfaces.

2. The bend radius manager of claim 1, wherein each of the plurality of lobes have substantially similar dimensions.

3. The bend radius manager of claim 1, wherein there are a plurality of arcuate sections defined between the base surface and the top surface, including generally rounded opposing end portions, an inner side portion, and an outer side portion, the inner side portion and the outer side portion positioned between the opposing end portions.

4. The bend radius manager of claim 3, wherein the plurality of lobes are disposed on the base in a generally circular configuration having a circumference defined in part by the outer side portions of the plurality of lobes.

5. The bend radius manager of claim 4, wherein the generally circular configuration of the plurality of lobes has a radius generally equal to or greater than the minimum bend radius of the media that the bend radius manager is configured to receive.

6. The bend radius manager of claim 5, wherein the rounded end portions of the plurality of lobes have a radius less than the radius of the generally circular configuration of the plurality of lobes.

7. The bend radius manager of claim 4, wherein adjacent lobes of the plurality of lobes are equally spaced apart from each other along the circumference of the generally circular configuration.

8. The bend radius manager of claim 3, wherein each of the plurality of lobes has a generally oval cross section.

9. The bend radius manager of claim 1, wherein the plurality of lobes includes at least three lobes.

10. The bend radius manager of claim 1, wherein the plurality of lobes are integrally formed with the base.

11. The bend radius manager of claim 1, wherein the outer surfaces of two adjacent lobes define a media channels therebetween.

12. A bend radius manager comprising:
- a base having a surface; and
- a plurality of discrete lobes extending away from the base surface and terminating at a top surface, an outer surface including at least one arcuate section defined between the base and the top surface, the plurality of lobes configured to receive at least one media having a minimum bend radius; and
- a coating is applied to the outer surface of the plurality of discrete lobes, wherein the coating increases the frictional qualities of the outer surfaces.

* * * * *